(12) United States Patent
Kosmyna et al.

(10) Patent No.: US 7,981,197 B2
(45) Date of Patent: Jul. 19, 2011

(54) EASILY REMOVABLE FILTER BOWL FOR PAINT SPRAY GUNS

(75) Inventors: Michael Kosmyna, Toledo, OH (US); Marvin Burns, Millbury, OH (US)

(73) Assignee: Illinois Tool Works Inc., Glenview, IL (US)

( * ) Notice: Subject to any disclaimer, the term of this patent is extended or adjusted under 35 U.S.C. 154(b) by 467 days.

(21) Appl. No.: 12/073,585

(22) Filed: Mar. 7, 2008

(65) Prior Publication Data
US 2009/0223189 A1   Sep. 10, 2009

(51) Int. Cl.
*B01D 46/24* (2006.01)
(52) U.S. Cl. ............... 95/273; 55/498; 55/503; 55/504; 55/DIG. 5; 210/441; 210/442; 210/445; 210/455
(58) Field of Classification Search ............ 55/323, 55/337, 488, 482, 498, DIG. 17, DIG. 18, 55/DIG. 46, 385.1, 383, 467, 473, 385.3; 96/408, 421, 351, 352; 239/DIG. 14; 118/326; 454/50, 53, 63; 29/33.2, 103, 104, 105, 214, 29/215, 216, 264, 265; 292/149, 248, 276, 292/291, 294; 210/441, 442, 445, 455
See application file for complete search history.

(56) References Cited

U.S. PATENT DOCUMENTS

| | | | | |
|---|---|---|---|---|
| 2,624,405 A * | 1/1953 | Lynch | ............. | 160/353 |
| 5,078,762 A * | 1/1992 | Hung | .............. | 96/408 |
| 5,744,030 A * | 4/1998 | Reid et al. | ............. | 210/235 |
| 5,935,282 A * | 8/1999 | Lin | .............. | 55/385.6 |
| 5,984,109 A * | 11/1999 | Kanwar et al. | ............. | 210/440 |
| 7,563,299 B2 * | 7/2009 | Baptista da Costa et al. | .. | 55/488 |
| 7,628,835 B2 * | 12/2009 | Horiuchi | ............. | 55/385.3 |
| 2004/0079693 A1 * | 4/2004 | Hacker et al. | ............. | 210/249 |
| 2007/0137156 A1 * | 6/2007 | da Costa et al. | ............. | 55/486 |
| 2008/0142426 A1 * | 6/2008 | Greco et al. | ............. | 210/234 |
| 2010/0140157 A1 * | 6/2010 | Greco et al. | ............. | 210/234 |

FOREIGN PATENT DOCUMENTS

CA   1242153   9/1988
KR   20080024550   3/2008

* cited by examiner

*Primary Examiner* — Duane Smith
*Assistant Examiner* — Minh-Chau Pham
(74) *Attorney, Agent, or Firm* — Law Offices of Steven W. Weinrieb

(57) ABSTRACT

A filter bowl and filter cover assembly is provided wherein the filter bowl is adapted to be easily mounted upon and removed from the filter cover by a plurality of bolt fasteners as a result of the bolt fasteners, connecting the filter bowl to the filter cover, being loosened to a predetermined degree and rotating the filter bowl relative to the filter housing in a clockwise direction so as to permit the head portions of the bolt fasteners to pass through key-hole shaped apertures formed within the filter cover. The filter bowl is able to likewise be easily and quickly re-installed upon the filter cover as a result of a reversal of the aforenoted removal procedures.

16 Claims, 5 Drawing Sheets

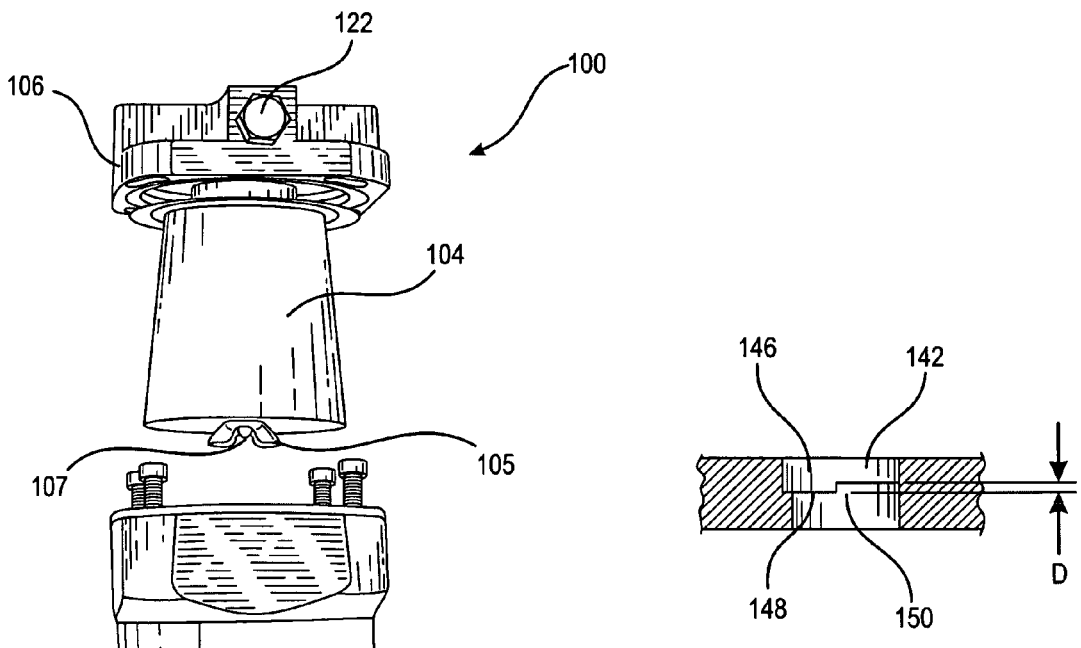
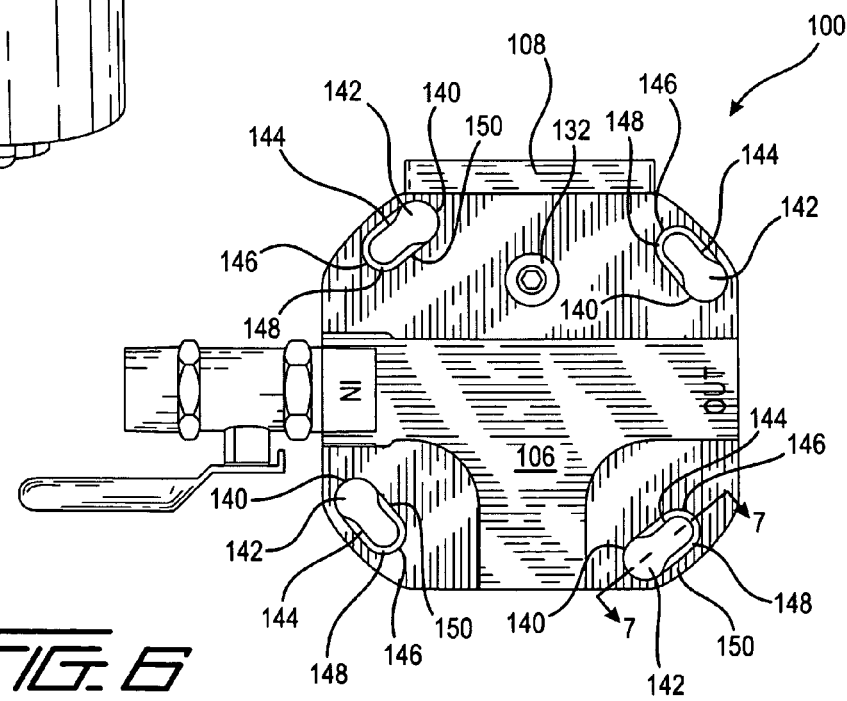

US 7,981,197 B2

EASILY REMOVABLE FILTER BOWL FOR PAINT SPRAY GUNS

FIELD OF THE INVENTION

The present invention relates generally to paint spray guns for painting substrates, and more particularly to a new and improved filter bowl and filter cover assembly wherein the filter bowl or housing is adapted to be easily mounted upon and removed from the filter cover. A filter container assembly is disposed within the filter bowl or housing and comprises an internally disposed filter element for filtering the compressed air being supplied to the paint spray gun in order to ensure that undesirable dust, debris, contaminants, or the like, are not entrained with the compressed air being supplied to the paint spray gun whereby such dust, debris, contaminants, or the like, would obviously foul the paint and mar the finish of the substrate being painted. The filter bowl or housing is adapted to be secured upon the filter cover by means of a plurality of bolt fasteners, and the filter cover is, in turn, adapted to be fixedly mounted upon a suitable support surface, such as, for example, a wall member, by means of an integral mounting bracket which is fixedly secured to the wall member by additional bolt fasteners. The filter bowl or housing is able to be easily and quickly removed or disengaged from the combination filter cover and mounting bracket as a result of the bolt fasteners, connecting the filter bowl or housing to the combination filter cover and mounting bracket, being loosened to a predetermined degree so as to permit the head portions of such bolt fasteners to effectively be disengaged from the combination filter cover and mounting bracket. When the filter bowl or housing has been removed or disengaged from the combination filter cover and mounting bracket, the bolt fasteners, connecting the filter bowl or housing to the combination filter cover and mounting bracket, remain engaged with or mounted upon the filter bowl or housing so as not to become separated therefrom and thereby possibly become lost. The filter bowl or housing is able to likewise be easily and quickly re-installed or remounted upon the combination filter cover and mounting bracket as a result of a reversal of the aforenoted removal or disengagement procedures.

BACKGROUND OF THE INVENTION

Paint spraying operations, comprising the use of paint spray guns, normally require the use of compressed air to effectively entrain paint therewith to be sprayed onto, for example, a suitable substrate to be painted. The compressed air needs to be filtered so as to effectively ensure that undesirable dust, debris, contaminants, or the like, are not entrained with the compressed air being supplied to the paint spray gun whereby such dust, debris, contaminants, or the like, would obviously foul the paint and mar the finish of the painted substrate. The compressed air being supplied to the paint spray gun is normally filtered by means of a suitable filter element which is an integral part of a filter canister that is normally disposed within a filter bowl or housing. The filter bowl or housing is normally removably mounted upon a filter cover, and the filter cover is operatively connected to a mounting bracket which is fixedly mounted upon a suitable support surface, such as, for example, a wall member. The filter element needs to be frequently changed or replaced, and therefore, access to the filter element requires removal of the filter bowl or housing from the filter cover. Conventionally, the filter bowl or housing is mounted upon the filter cover by several different means or structural assemblies.

A first means or structural assembly for mounting the filter bowl or housing upon its filter cover comprises the use of a plurality of bolt fasteners or screws. The operative advantage of such a structural assembly is that since the bolt fasteners or screws require a tool, such as, for example, a screw driver or the like, to remove the bolt fasteners or screws from the filter cover, the filter bowl is fixedly attached to, and securely mounted upon, the filter cover so as not to be subjected to inadvertent, accidental, or un-authorized removal or disengagement therefrom. Conversely, however, the operative disadvantage of such a structural assembly resides in the fact that the bolt fasteners or screws must be completely removed or disengaged from the filter cover in order to, in turn, permit the filter bowl or housing to be removed from the filter cover in order to thereby permit maintenance personnel to in fact gain access to the filter element disposed internally within the filter bowl or housing. Accordingly, the disassembly and re-assembly process, to be performed upon this structural assembly, is quite time-consuming and tedious. A second conventional means or structural assembly for mounting the filter bowl or housing upon its filter cover comprises the use of a quick-release ring which, in fact, is released by means of a suitable latch mechanism, however, since the latch mechanism can be inadvertently or accidentally actuated, this structural assembly is not desirable from a system operational security or integrity point of view. A third conventional means or structural assembly for mounting the filter bowl or housing upon its filter cover comprises the use of an internally threaded retaining ring which may be mounted, for example, upon the filter bowl or housing and which is adapted to be threadedly engaged with an externally threaded portion of the filter cover, or alternatively, the use of an internally threaded retaining ring that may be mounted, for example, upon the filter cover and which is adapted to be threadedly engaged with an externally threaded portion of the filter bowl or housing. In either case, the disassembly and re-assembly procedures are, again, quite time-consuming and tedious.

A need therefore exists in the art for a new and improved structural system for operatively connecting and mounting a filter bowl or housing upon a filter cover of a filter assembly such that the filter bowl or housing may be easily and quickly removed from, and mounted upon, the filter cover without exhibiting the operational disadvantages characteristic of the prior art or conventional filter bowl or housing mounting systems or structural assemblies. More particularly, a need exists in the art for a new and improved structural system for operatively connecting and mounting a filter bowl or housing upon a filter cover of a filter assembly wherein the filter bowl or housing may be easily and quickly removed from, and mounted upon, the filter cover, wherein the filter bowl or housing can only be removed from the filter cover in a conscious manner so as to effectively prevent the accidental or inadvertent removal of the filter bowl or housing from the filter cover, and wherein, when the filter bowl or housing is removed from the filter cover, the bolt fasteners or screws, connecting the filter bowl or housing to the filter cover, will remain engaged with the filter bowl or housing so as not to thereby be separated therefrom and possibly become lost.

SUMMARY OF THE INVENTION

The foregoing and other objectives are achieved in accordance with the teachings and principles of the present invention through the provision of a new and improved system or assembly, for mounting a filter bowl or housing upon a filter housing, wherein the filter bowl or housing has a filter container assembly disposed therewithin and which comprises a filter element for filtering compressed air being supplied to a paint spray gun in order to ensure that undesirable dust, debris, contaminants, or the like, are not entrained with the compressed air being supplied to the paint spray gun whereby such dust, debris, contaminants, or the like, would obviously foul the paint and mar the finish of the painted substrate. The filter bowl or housing is adapted to be secured upon the filter cover by means of a plurality of bolt fasteners, and the filter cover is, in turn, adapted to be fixedly mounted upon a suitable support surface, such as, for example, a wall member, by means of a mounting bracket which is integral with the filter cover and which is adapted to be fixedly secured to the wall member by additional bolt fasteners. The filter cover has a substantially square-shaped configuration and is provided with, for example, four through-bores or apertures within each one of the corner regions thereof.

Each one of the through-bores or apertures has a substantially key-hole shaped configuration wherein the head portion of each one of the bolt fasteners or screws is initially passed through the enlarged circular portion of a respective one of the key-hole shaped through-bores or apertures so as to effectively be disposed above the enlarged circular portion of the key-hole shaped through-bore or aperture. Accordingly, upon relative rotation of the filter bowl or housing with respect to the filter cover, the shank portions of the bolt fasteners or screws will move or pass into the relatively narrow slot portions of the key-hole shaped through-bores or apertures. The ends of the relatively narrow slot portions of each one of the key-hole shaped throughbores or apertures have enlarged portions which have counter-bored portions defining substantially radially inwardly extending vertically recessed C-shaped ledges or flanged portions, and consequently, upon lowering the filter bowl with respect to the filter cover, the heads of the bolt fasteners or screws will effectively be lowered and seated upon the flanged or ledge portions of the enlarged counterbored portions so as not to be able to pass back through the key-hole shaped through-bores or holes. Upon tightening of the bolt fasteners or screws, the filter bowl is therefore fixedly secured upon the combination filter cover and mounting bracket.

In order to remove the filter bowl from the combination filter cover and mounting bracket, the reverse procedure is effectively implemented. More particularly, the bolt fasteners or screws are simply loosened predetermined degrees or amounts, and the filter bowl is moved upwardly so as to effectively disengage the enlarged head portions of the bolt fasteners or screws from their seated positions upon the vertically recessed radially inwardly extending flanged or ledge portions of the enlarged counterbored portions of the filter cover. When the filter bowl is then subsequently rotated in the opposite direction, the enlarged head portions of the bolt fasteners or screws will now effectively be aligned with the enlarged circular portions of the key-hole shaped through bores or apertures formed within the filter cover whereby the enlarged head portions of the bolt fasteners or screws can pass back through the enlarged circular portions of the key-shaped through-bores or apertures of the filter cover so as to permit the filter bowl to be lowered and removed or disengaged from the filter cover in an easy and quick manner. It is to be appreciated that when the filter bowl or housing is removed from the combination filter cover and mounting bracket, the bolt fasteners, connecting the filter bowl or housing to the combination filter cover and mounting bracket, remain engaged with or mounted upon the filter bowl or housing so as not to become separated therefrom and thereby possibly become lost.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 2 is a side elevational view, similar to that of FIG. 1, wherein, however, the compressed air inlet connector, and its shut-off valve, as well as the compressed air outlet connector, and its pressure regular and pressure gauge assembly, have not been illustrated, and wherein further, the filter bowl or housing has been removed or disengaged from the filter cover so as to permit maintenance personnel access to the filter container having the filter element disposed internally thereof;

FIG. 6 is a top plan view of the filter cover member of the new and improved filter bowl and cover assembly, as constructed in accordance with the principles and teachings of the present invention, with the compressed air inlet connector and shut-off valve assembly operatively connected thereto, and showing the details of the key-hole shaped through-bores or apertures along with their recessed or depressed counter-bored regions for seating or accommodating the enlarged head portions of the bolt fasteners or screws when the bolt fasteners or screws, mounted upon the filter bowl, are to be seated or accommodated within the recessed or depressed counterbored regions of the key-shaped holes so as to in fact fixedly mount the filter bowl upon the filter cover; and FIG. 7 is a partial cross-sectional view of the filter cover as illustrated within FIG. 6 as taken along the lines 7-7 of FIG. 6.

DETAILED DESCRIPTION OF THE PREFERRED EMBODIMENT

Figure 1:
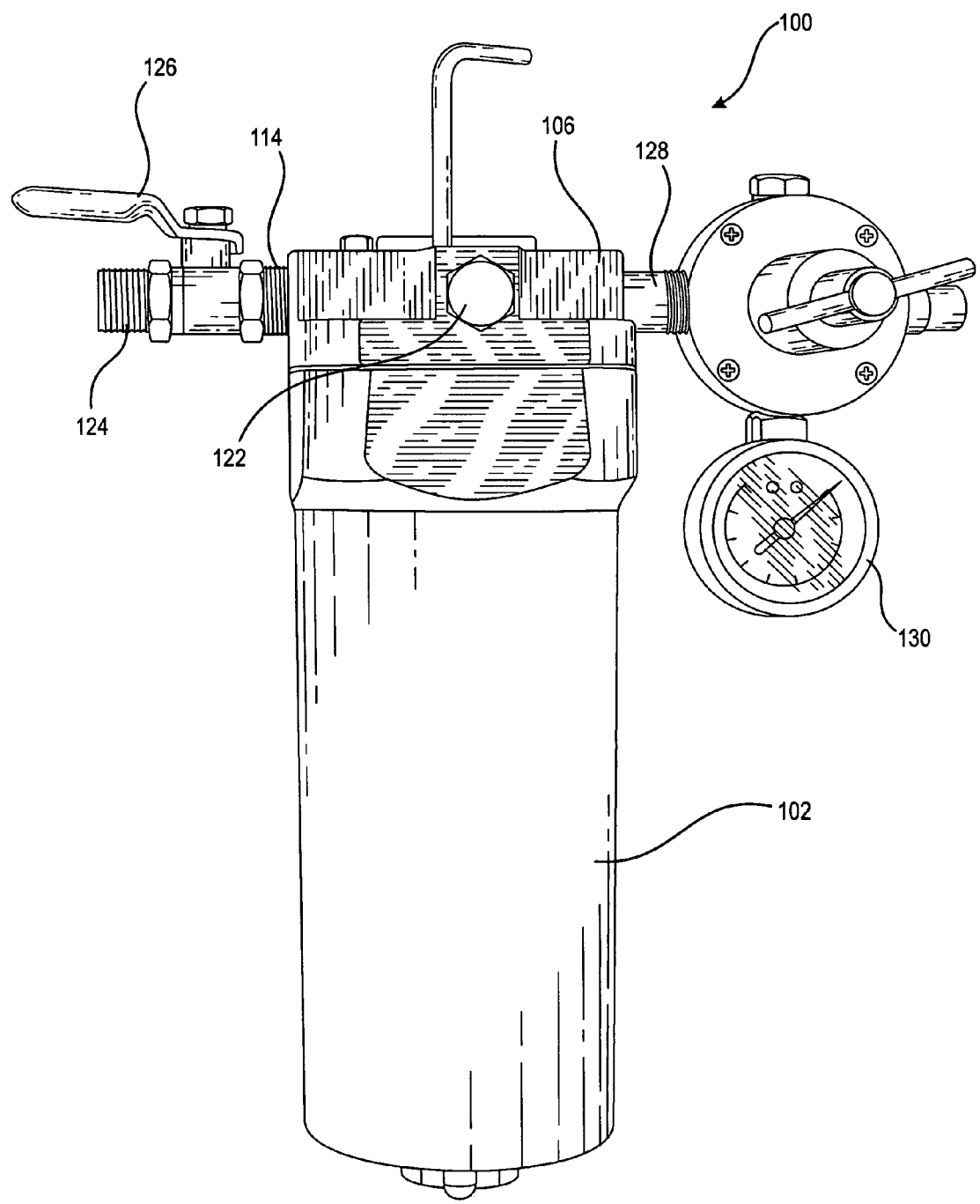
FIG. 1 is a side elevational view of a new and improved filter bowl and filter cover assembly, as constructed in accordance with the principles and teachings of the present invention, and showing the cooperative parts thereof assembled together, wherein the filter cover is shown having a compressed air inlet connector, having a shut-off valve operatively associated therewith, operatively connected to a left side portion thereof, and a compressed air outlet connector, having an air pressure regulator and pressure gauge assembly operatively associated therewith, operatively connected to a right side portion thereof.

Referring now to the drawings, and more particularly to FIGS. 1-7 thereof, a new and improved filter bowl and filter cover assembly, as constructed in accordance with the principles and teachings of the present invention, is disclosed and is generally indicated by the reference character 100. The filter bowl and filter cover assembly 100 is adapted to be used for filtering incoming compressed air that is being supplied to, for example, a paint spray gun in order to ensure that undesirable dust, debris, contaminants, or the like, are not entrained with the compressed air being supplied to the paint spray gun whereby such dust, debris, contaminants, or the like, would obviously foul the paint and mar the finish of the substrate being painted. More particularly, it is seen that the new and improved filter bowl and filter cover assembly 100 comprises a filter bowl or housing 102 within which there is disposed a filter container 104, as illustrated or seen within FIG. 2, within which, in turn, there is disposed a filter element, not shown, for filtering the compressed air being supplied to the paint spray gun in order to ensure that undesirable dust, debris, contaminants, or the like are not entrained with the compressed air being supplied to the paint spray gun whereby such dust, debris, contaminants, or the like, would obviously foul the paint and mar the finish of the substrate being painted.

The filter bowl and filter cover assembly 100 further comprises a filter cover 106 to which the filter bowl or housing 102 is adapted to be removably attached, as will be more fully discussed hereinafter, and it is to be appreciated that the filter container 104 is fixedly secured to an undersurface portion of the filter cover 106 by means of a wing nut 105 which is adapted to be threadedly secured upon the lower end portion of an externally threaded shaft 107 fixedly connected to the filter cover 106 and passing through the filter container 104. In addition, it is also to be appreciated that the filter cover 106 is adapted to be disposed within a horizontal mode or within a horizontally oriented plane such that when the filter bowl or housing 102 is attached thereto, the filter bowl or housing 102 will, in effect, be suspended or depend downwardly from the filter cover 106. It is also seen that the filter cover 104 is integrally connected to, for example, a vertically oriented mounting racket 108, and that the vertically oriented mounting bracket 108 is provided with, for example, a pair of apertures or through bores 110 for receiving or accommodating suitable bolt fasteners or screws, not shown. In this manner, the combination filter cover and mounting bracket assembly 106,108 can be fixedly secured to a suitable support surface, such as, for example, a vertically oriented wall member, not shown.

Figure 3:
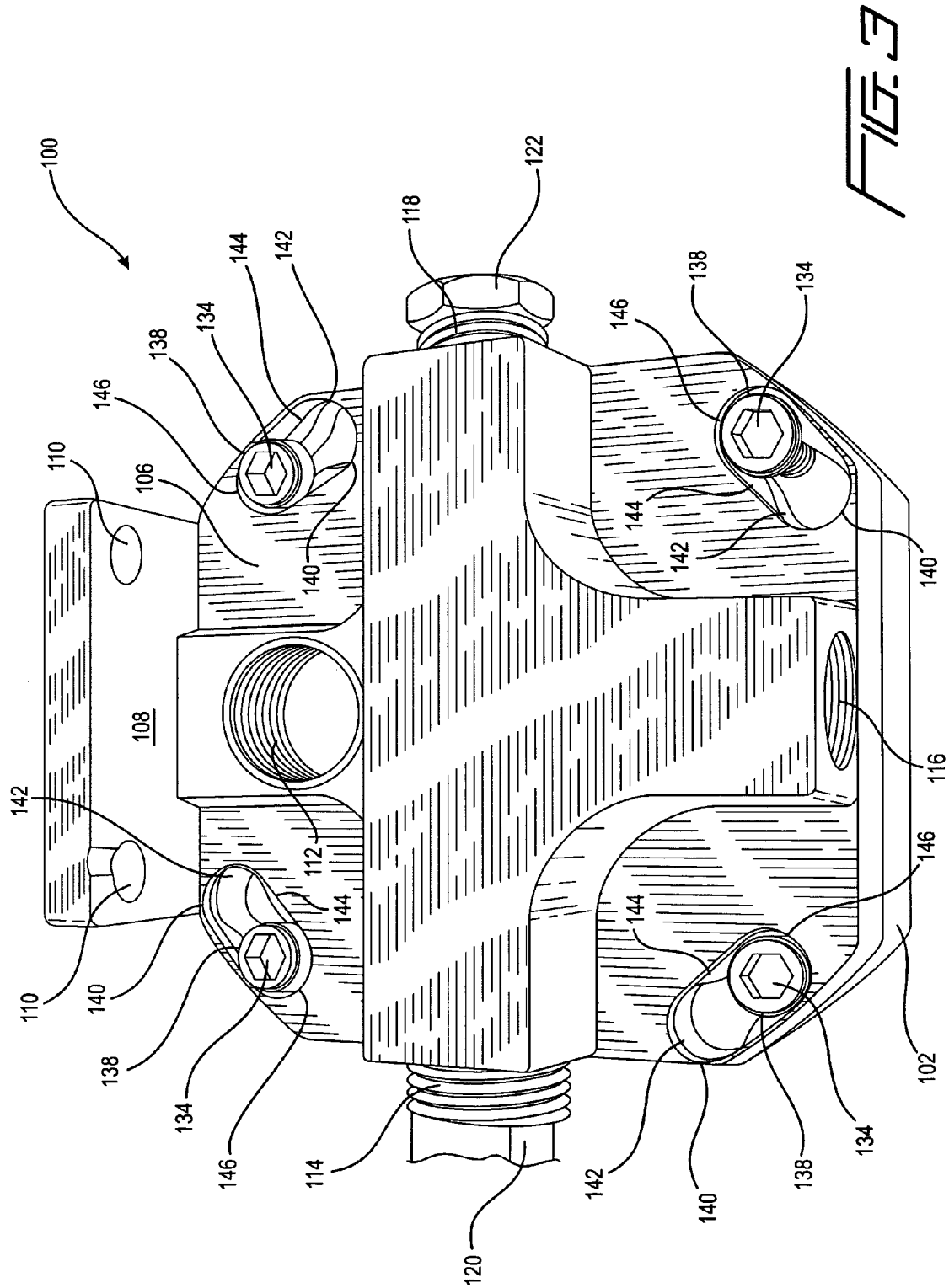
FIG. 3 is a top perspective view of the new and improved filter bowl and filter cover assembly, as constructed in accordance with the principles and teachings of the present invention, and as shown in FIG. 1 and 2, showing the filter bowl fixedly attached to the filter cover by means of the bolt fasteners or screws.
Figure 4:
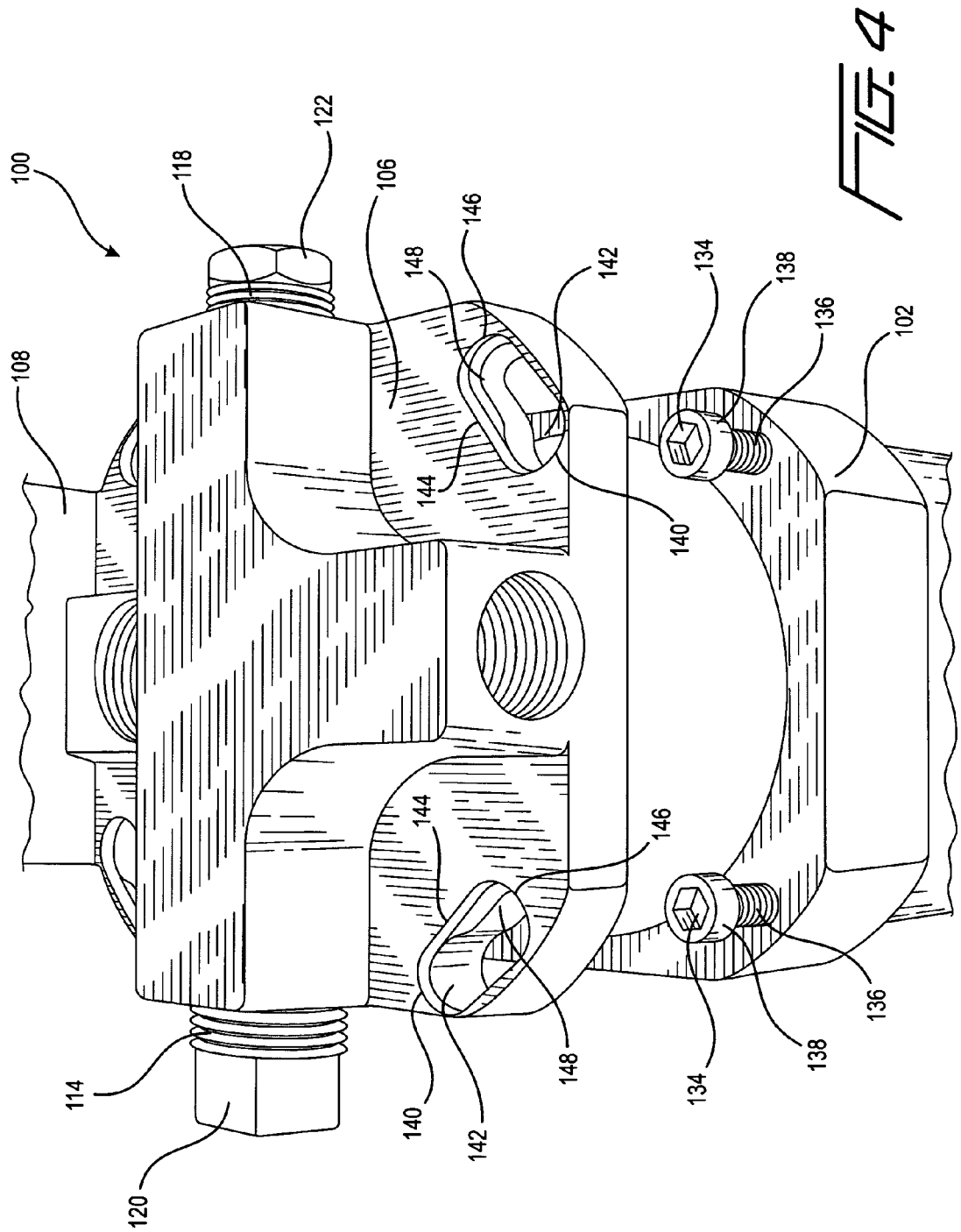
FIG. 4 is a top perspective view of the new and improved filter bowl and filter cover assembly, similar to that of FIG. 3, showing, however, the filter bowl detached, disengaged, or removed from the filter cover and showing the bolt fasteners or screws as remaining engaged or mounted within the filter bowl after the filter bowl has been detached, disengaged, or removed from the filter cover.
Figure 5:
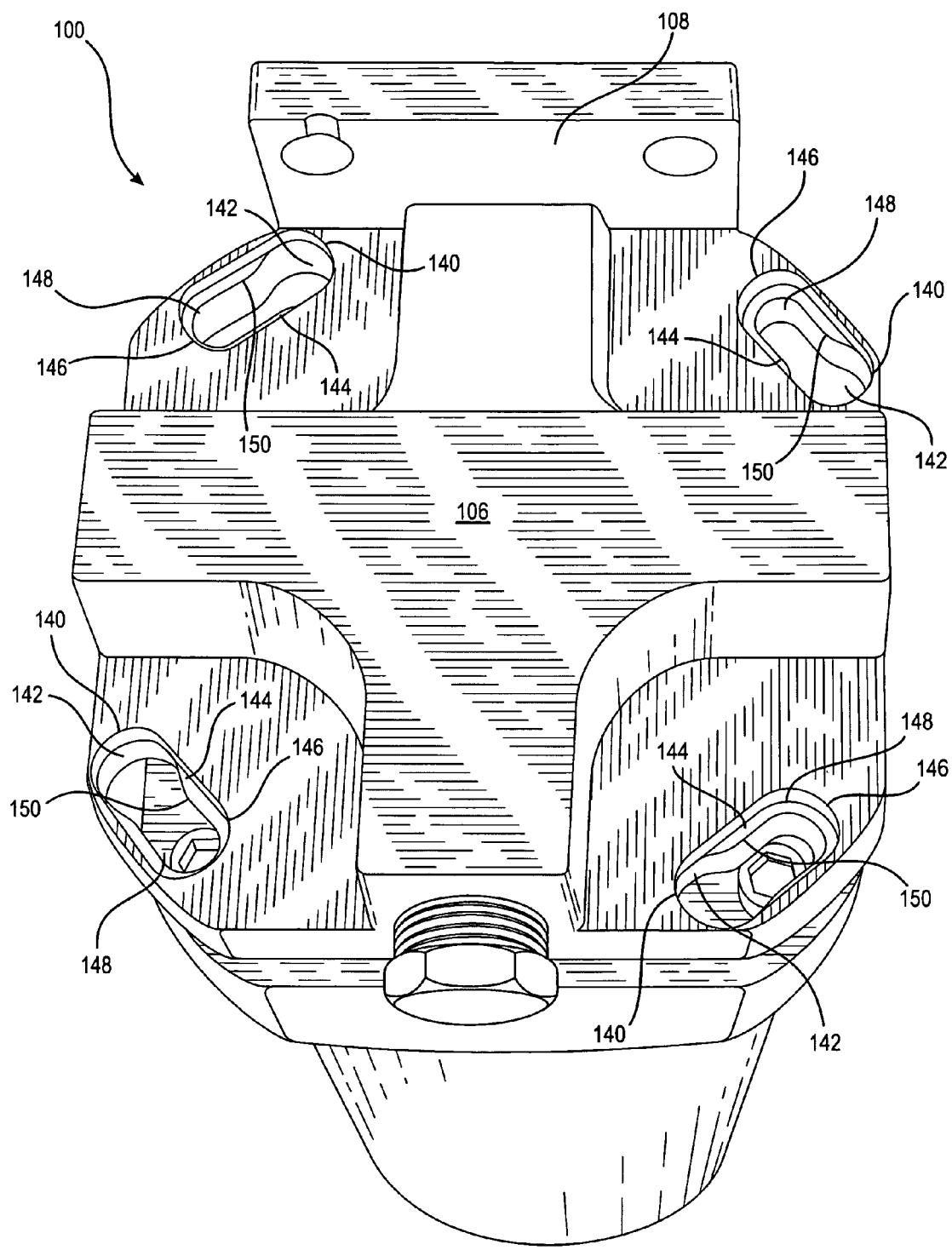
FIG. 5 is a top perspective view of the new and improved filter bowl and filter cover assembly, similar to that of FIG. 4, showing, however, the bolt fasteners or screws having been removed from the filter bowl and filter cover assembly so as to clearly illustrate the details of the key-hole shaped through-bores or apertures having the recessed or depressed counter-bored regions thereof for seating or accommodating the enlarged head portions of the bolt fasteners or screws when the bolt fasteners or screws, mounted upon the filter bowl, are in fact to be seated or accommodated within the recessed or depressed counterbored regions of the key-shaped holes so as to in fact fixedly mount the filter bowl upon the filter cover.

As can best be appreciated from FIGS. 3 and 4, the filter cover 106 may be provided with a plurality of different compressed air inlet and outlet ports, such as, for example, air inlet ports 112,114 and air outlet ports 116, 118, however, only one air inlet port and one air outlet port will be used at a particular time. The inlet and outlet ports 112,114,116,118 are internally threaded so as to be threadedly connected to, for example, a compressed air inlet connector which provides a supply of compressed air from a suitable compressed air supply source, not shown, and a compressed air outlet connector which is adapted to conduct the compressed air to, for example, the paint spray gun. Accordingly, when the other inlet or outlet port is not being used, suitable externally threaded plugs 120,122 will, for example, be threadedly mated with, and disposed within, the non-used inlet or outlet port as illustrated, for example, within FIGS. 3 and 4. In accordance with the particular filter cover 106 disclosed within FIGS. 1 and 2, it is seen that the plug 122 has actually been threadedly disposed within the air outlet port 116, and that, as illustrated within FIG. 1, a compressed air inlet connector 124, having a shut-off valve mechanism 126 operatively associated therewith, has been operatively connected to the air inlet port 114, while a compressed air outlet connector 128, having a compressed air regulator and pressure gauge assembly 130 operatively associated therewith, has been operatively connected to the air outlet port 118. Still yet further, as can be seen from the particular filter cover 106 illustrated within FIG. 5, the air inlet port 112 has effectively been eliminated, and still alternatively, as can be seen from the particular filter cover 106 illustrated within FIG. 6, the air inlet port 112 has effectively been replaced by means of a receptacle 132 for storing, for example, a suitable tool, such as, for example, an Allen wrench, for a purpose to be explained more fully hereinafter.

Continuing further, and as can best be seen or appreciated from FIGS. 3-6, the filter cover 106 is seen to have a substantially square-shaped configuration, although, of course, as can also be seen or appreciated, the corner regions thereof are effectively substantially rounded or radiused. In addition, as can best be seen or appreciated from FIGS. 3 and 4, the filter bowl or housing 102 is provided with a plurality of bolt fasteners or screws 134, such as, for example, four bolt fasteners or screws 134, only two of which are visible within FIG. 4, although all four of the bolt fasteners or screws 134 are visible at their mounted positions within FIG. 3. More particularly, it is seen that each one of the bolt fasteners or screws 134 comprises an externally threaded shank portion 136 having a relatively small diametrical extent, and a head portion 138 having a relatively large diametrical extent. In addition, it is seen that the filter cover 106 is correspondingly provided with four substantially key-hole shaped through-bores or apertures 140 which, in turn, comprise relatively large substantially circular portions 142 and relatively narrow elongated slot portions 144, as can best be seen in FIGS. 3-6. Still yet further, as can best be seen within or appreciated from FIGS. 4-7, each one of the key-hole shaped through-bores or apertures 140 is also provided with relatively enlarged counterbored regions 146 which are disposed opposite the enlarged circular portions 142 of the key-hole shaped through-bores or apertures 140. Each one of the enlarged counterbored regions 146 has a diametrical extent similar to that of each one of the enlarged circular portions 142 of the key-hole shaped through-bores or apertures 140 so as to likewise accommodate the relatively enlarged head portions 138 of the bolt fasteners or screws 134, however, it is also seen that each one of the enlarged counterbored regions 146 has operatively associated therewith a substantially C-shaped radially inwardly extending flanged or ledge portion 148 which is located at a vertically recessed position due to the counterbored structure. It is therefore to be appreciated that these vertically recessed, radially inwardly extending ledge or flanged portions 148 effectively serve as vertically recessed seats within which the relatively enlarged head portions 138 of the bolt fasteners or screws 134 can be seated when in fact that filter bowl or housing 102 is fixedly attached to the filter cover 106.

Having described substantially all of the structural components comprising the new and improved filter bowl and filter cover assembly 100, as has been constructed in accordance with the principles and teachings of the present invention, the removal or disengagement of the filter bowl or housing 102 from the combination filter cover and mounting bracket assembly 106,108, as well as the installation or remounting of the filter bowl or housing 102 onto the combination filter cover and mounting bracket assembly 106,108 will now be described. With reference being made, for example, to FIG. 3, the filter bowl or housing 102 is illustrated as being fully or completely installed or mounted in a fixed manner upon the combination filter cover and mounting bracket 106,108. Accordingly, it is seen that the relatively enlarged head portions 138 of the bolt fasteners or screws 134 are disposed within the relatively enlarged counterbored regions 146 and are actually seated upon the vertically recessed substantially C-shaped radially inwardly extending flanged or ledge portions 148. Therefore, when in fact the filter bowl or housing 102 is desired to be removed or disengaged from the combination filter cover and mounting bracket assembly 106,108, the bolt fasteners or screws 134 will be loosened to a predetermined degree or amount whereby, in effect, the filter bowl or housing 102 will be loosely hanging or suspended beneath the filter cover 106 to a predetermined degree.

The filter bowl or housing 102 may then be moved or pushed vertically upwardly so as to permit the relatively enlarged head portions 138 of the bolt fasteners or screws 134 to effectively be removed, disengaged, or unseated from the vertically recessed substantially C-shaped radially inwardly extending flanged or ledge portions 148 defined within the filter cover 106 and thereby be disposed within the upper regions of the relatively enlarged counterbored regions 146 defined within the filter cover 104. The depth of the vertically recessed substantially C-shaped radially inwardly extending flanged or ledge portions 148 with respect or relative to, for example, the relatively enlarged circular portions 142 of the key-hole shaped through-bores or apertures 140 can be more specifically appreciated from FIG. 7 wherein, for example, the difference in the depth dimensions, or in other words, the vertical distance that the vertically recessed substantially C-shaped radially inwardly extending flanged or ledge portions 148 are located below the relatively enlarged circular portions 142 of the key-hole shaped through-bores or apertures 140, is denoted as D and may comprise, for example, approximately 0.045 of an inch (0.045"). Subsequently, the filter bowl or housing 102 may now be rotated in the clockwise direction, relative to the combination filter cover and mounting bracket assembly 106,108 as directionally viewed in either one of FIGS. 3-6, whereby the relatively small or narrow shank portions 136 of the bolt fasteners 134 will be able to move through the relatively narrow elongated slot portions 144 of the key-hole shaped bores or apertures 140 and in this manner permit the relatively enlarged head portions 138 of the bolt fasteners or screws 134 to now be effectively aligned with the relatively enlarged circular portions 142 of the key-hole shaped bores or apertures 140.

It is to be appreciated that unless the filter bowl 102 is in fact initially moved vertically upwardly within the relatively enlarged counterbored regions 146 defined within the filter cover 104 prior to, for example, the clockwise rotation of the filter bowl or housing 102 relative to the combination filter cover and mounting bracket assembly 106,108, as has been previously noted, the clockwise rotation of the filter bowl or housing 102 will not in fact be able to be accomplished due to the fact that the head portions 138 of the bolt fasteners or screws 134 will still, in effect, be seated upon their flanged or ledge seat portions or members 148 and will engage, in effect, shoulder portions 150 which effectively separate the enlarged circular portions 142 of the key-hole shaped through-bores or apertures 140 and the enlarged counterbored regions 146. This structural arrangement therefore effectively comprises a safety locking system to the effect that the filer bowl or housing 102 does not simply drop away or be inadvertently disengaged from the filter cover and mounting bracket assembly 106,108 and that a conscious effort and procedure must be implemented in order to in fact remove or disengage the filter bowl or housing 102 from the filter cover and mounting bracket assembly 106,108.

Once the filter bowl or housing 102 has in fact, however, been moved vertically upwardly so as to in fact permit the head portions 138 of the bolt fasteners or screws 134 to in fact clear the aforenoted shoulder portions 150, and once the filter bowl or housing 102 has been rotated in the aforenoted clockwise direction, the filter bowl or housing 102 may now be totally dismounted, disengaged, and removed from the combination filter cover and mounting bracket assembly 106,108 as a result of the relatively enlarged head portions 138 of the bolt fasteners or screws 134 passing through the relatively enlarged circular portions 142 of the key-hole shaped bores or apertures 140. Accordingly, free access to the filter element or the filter container 104, disposed within the filter bowl or housing 102, is now permitted so as to, in turn, permit the replacement of the filter element, not illustrated, disposed within the filter container 104. It is to be appreciated further, as can best be seen in FIG. 4, that when the filter bowl or housing 102 has in fact been totally dismounted, disengaged, and removed from the combination filter cover and mounting bracket assembly 106,108, the bolt fasteners or screws 134 remain engaged with, attached to, or mounted upon the filter bowl or housing 102 so as not to be separated therefrom and thereby possibly become lost.

Continuing further, and conversely, when the old filter container 104, having the old filter element disposed therein, has been replaced with a new filter container 104 having a new filter element disposed therein, the filter bowl or housing 102 is now ready to be remounted upon the combination filter cover and mounting bracket assembly 106,108 by means of procedures which are effectively the reverse of the procedures previously effectuated to disengage, dismount, or remove the filter bowl or housing 102 from the combination filter cover and mounting bracket assembly 106,108. More particularly, for example, the relatively enlarged head portions 138 of the bolt fasteners or screws 134 are aligned with and inserted through the relatively enlarged circular portions 142 of the key-hole shaped bores or apertures 140 such that the relatively enlarged head portions 138 of the bolt fasteners or screws 134 will be disposed vertically above the relatively enlarged circular portions 142 of the key-hole shaped bores or apertures 140. The filter bowl or housing 102 is then rotated, relative to the combination filter cover and mounting bracket assembly 106,108, in the counterclockwise direction so as to permit the relatively narrow shank portions 136 of the bolt fasteners or screws 134 to pass through the relatively narrow slot portions 144 of the key-hole shaped bores or apertures 140 until the relatively enlarged head portions 138 of the bolt fasteners or screws 134 are effectively aligned with and disposed above the relatively enlarged counterbored portions 146 of the key-hole shaped bores or apertures 140. The filter bowl or housing 102 is then vertically lowered so as to in fact permit the relatively enlarged head portions 138 of the bolt fasteners or screws 134 to in fact be seated within the counterbored portions 146 of the key-hole shaped bores or apertures 140 and upon the recessed radially inwardly extending flanged or ledge seat portions 148. Finally, while the filter bowl or housing 102 is effectively hanging or suspended from the combination filter cover and mounting bracket assembly 106,108, the bolt fasteners or screws 134 may be tightened so as to in fact tightly and securely fasten the filter bowl or housing 102 onto the combination filter cover and mounting bracket assembly 106,108.

Thus, it may be seen and appreciated that in accordance with the teachings and principles of the present invention, there has been provided a new and improved filter bowl and filter cover assembly wherein the filter bowl or housing is adapted to be easily mounted upon and removed from the filter cover. The filter bowl or housing is adapted to be secured upon the filter cover by means of a plurality of bolt fasteners, and the filter bowl or housing is able to be easily and quickly removed or disengaged from the filter cover as a result of the bolt fasteners, connecting the filter bowl or housing to the filter cover, being loosened to a predetermined degree so as to permit the head portions of such bolt fasteners to effectively be disengaged from the filter cover as a result of the filter bowl or housing being rotated relative to the filter cover so as to permit the head portions of the bolt fasteners or screws to pass through key-hole shaped through-bores or holes formed within the filter cover. When the filter bowl or housing has been removed or disengaged from the filter cover, the bolt fasteners, connecting the filter bowl or housing to the filter cover, remain engaged with or mounted upon the filter bowl or housing so as not to become separated therefrom and thereby possibly become lost. The filter bowl or housing is able to likewise be easily and quickly re-installed or remounted upon the filter cover as a result of a reversal of the aforenoted removal or disengagement procedures.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A filter assembly, comprising a filter bowl adapted to be quickly, easily, and entirely removed from a filter cover, while fasteners, mounting the filter bowl upon the filter cover, remain mounted upon the filter bowl, when the fasteners are disposed in a loosened state, so as to permit personnel access to the filter element in order to replace the same, comprising:
   a filter bowl, defined around an axis, for enclosing the filter element, and having a plurality of threaded bores defined therein;
   a filter cover, also defined around said axis, to which said filter bowl is to be secured and for covering said filter bowl within which the filter element is disposed;
   a plurality of bolt fasteners, comprising threaded shank portions and head portions, threadedly engaged within said threaded bores of said filter bowl such that said head portions project away from said filter bowl; and
   a plurality of key-hole slots defined within said filter cover and having structurally associated therewith a plurality of axially recessed ledge portions wherein each one of said head portions of said fasteners will be respectively engaged within each one of said axially recessed ledge portions of said key-hole slots when said plurality of fasteners are tightened so as to fixedly secure said filter bowl upon said filter cover, whereas when said plurality of fasteners are loosened such that said head portions of said plurality of fasteners are respectively axially disengaged from said axially recessed ledge portions, said fasteners can then be respectively moved through said key-hole slots so as to permit said filter bowl to be removed from said filter cover.

2. The filter assembly as set forth in claim 1, further comprising:
   a filter container removably connected to said filter cover, said filter container configured to contain the filter element.

3. The filter assembly as set forth in claim 2, which includes:
   an externally threaded shaft member fixedly secured to said filter cover and passing through said filter container; and
   a wing nut configured to be threadedly engaged upon a free distal end of said externally threaded shaft member to retain said filter container upon said filter cover.

4. The filter assembly as set forth in claim 1, wherein:
   said filter cover has a substantially square-shaped cross-sectional configuration having four corner regions;
   said plurality of key-hole slots comprises four key-hole slots wherein each one of said four key-hole slots is located within one of said four corner regions of said filter cover; and
   said plurality of bolt fasteners comprises four bolt fasteners wherein each one of said four bolt fasteners operatively cooperates with one of said four key-hole slots.

5. The filter assembly as set forth in claim 1, wherein:
   each one of said key-hole slots comprises a first substantially circular portion for permitting said bolt fasteners to pass therethrough, and a second portion for preventing said bolt fastener from passing therethrough.

6. The filter assembly as set forth in claim 5, wherein:
   said axially recessed ledge portions are respectively connected to said second portions of said key-hole slots and are disposed opposite said first portions of said key-hole slots for permitting each one of said bolt fasteners to be disposed within said axially recessed ledge portions of said key-hole slots when said bolt fasteners are disposed at their tightened states.

7. The filter assembly as set forth in claim 1, further comprising:
   a mounting bracket integrally connected to said filter cover for mounting said filter assembly to a wall member.

8. A method for quickly and easily removably mounting a filter bowl, enclosing a filter element, upon a filter cover, while fasteners, mounting the filter bowl upon the filter cover, remain mounted upon the filter bowl, when the fasteners are disposed in a loosened state, so as to permit personnel access to the filter element in order to replace the same, comprising the steps of:
   providing a filter bowl, defined around an axis, for enclosing the filter element, and having a plurality of threaded bores defined therein;
   providing a filter cover, also defined around said axis, to which said filter bowl is to be secured and for covering said filter bowl within which the filter element is disposed;
   providing a plurality of bolt fasteners, comprising threaded shank portions and head portions, threadedly engaged with said threaded bores of said filter bowl such that said head portions project away from said filter bowl; and
   providing a plurality of key-hole slots within said filter cover wherein said plurality of key-hole slots have structurally associated therewith a plurality of axially recessed ledge portions wherein each one of said head portions of said fasteners will be respectively engaged within each one of said axially recessed ledge portions of said key-hole slots when said plurality of fasteners are tightened so as to fixedly secure said filter bowl upon said filter cover, whereas when said plurality of fasteners are loosened such that said head portions of said plurality of fasteners are respectively axially disengaged from said axially recessed ledge portions, said fasteners can then be respectively moved through said key-hole slots so as to permit said filter bowl to be removed from said filter cover.

9. The method as set forth in claim 8, which includes:
   providing a filter container for containing the filter element, and causing said filter container to be removably connected to said filter cover.

10. The method as set forth in claim 8, wherein:

each one of said plurality of key-hole slots includes a first substantially circular portion; and a second slot portion.

11. The method as set forth in claim 10, which includes:

inserting said plurality of bolt fasteners through said first circular shaped portions of said key-hole shaped slots of said filter cover; and causing said filter bowl to rotate with respect to said filter cover so as to cause said plurality of bolt fasteners to move from said first circular shaped portions of said key-hole slots of said filter cover to said second slot portions of said key-hole slots of said filter cover.

12. The method as set forth in claim 11, wherein:

said filter cover has a substantially square-shaped cross-sectional configuration having four corner regions;

said plurality of key-hole slots include four key-hole slots located within each one of said four corner regions of said substantially square-shaped filter cover; and said plurality of bolt fasteners include four bolt fasteners, each one of said four bolt fasteners configured to respectively cooperate with one of said four key-hole slots.

13. The method as set forth in claim 11, wherein:

said axially recessed portions of each one of said key-hole slots are connected to said second slot portions of said key-hole slots and are disposed opposite said first circular portions of said key-hole slots for permitting each one of said plurality of bolt fasteners to be disposed within said axially recessed portions of said key-hole slots when said headed bolt fasteners are disposed at their tightened states.

14. The method as set forth in claim 11, which includes:

causing said plurality of bolt fasteners to be moved axially with respect to said filter cover so as to permit said plurality of bolt fasteners to be removed from their engaged positions upon said ledge portions prior to rotation of said filter bowl with respect to said filter cover so as to permit said bolt fasteners to move from said recessed portions of said key-hole slots to said first circular portions of said key-hole slots so as to permit said bolt fasteners to pass through said first circular portion and there-by permit said filter bowl to be removed from said filter cover.

15. The method as set forth in claim 9, which includes:

providing an externally threaded shaft member fixedly secured to said filter cover and passing through said filter container; and threadedly engaging a wing nut upon a free distal end of said externally threaded shaft member so as to retain said filter container upon said filter cover.

16. The method as set forth in claim 8, which includes:

integrally connecting a mounting bracket to said filter cover for mounting said filter assembly upon a wall member.

\* \* \* \* \*